April 16, 1940.     S. GARCIA     2,197,659
AUTOMATIC BELT TURNER MECHANISM
Filed Feb. 20, 1939     3 Sheets-Sheet 1
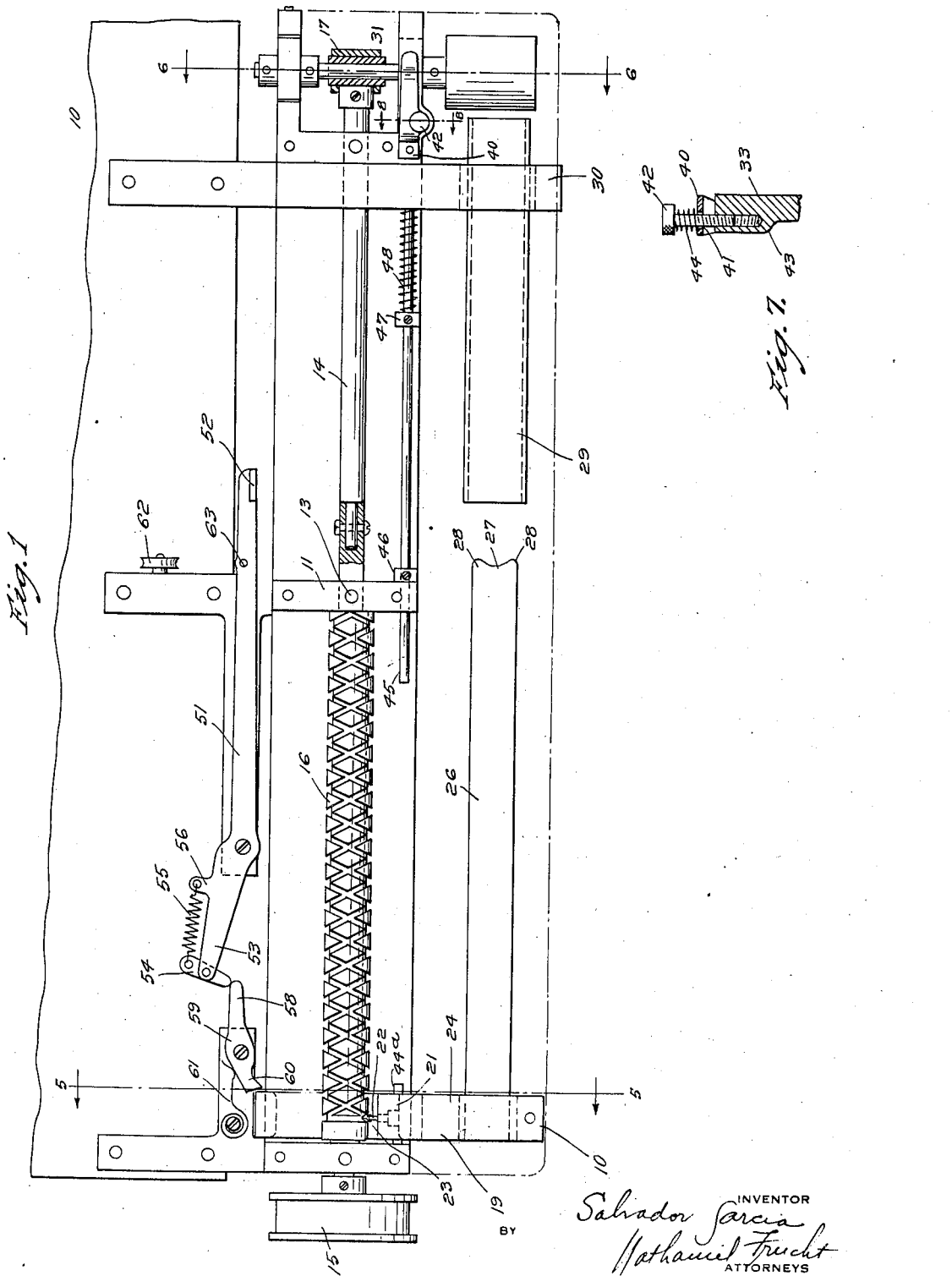

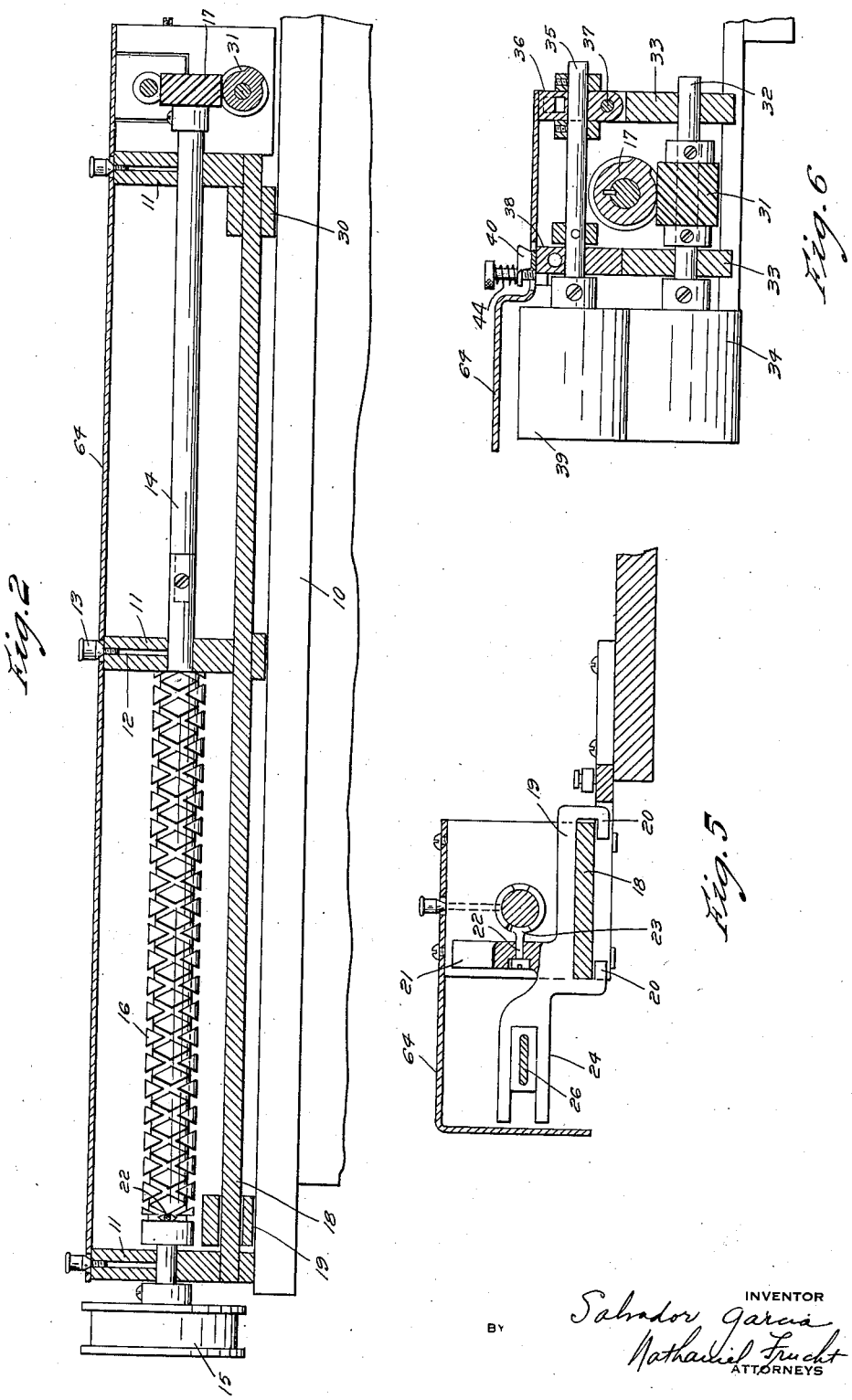

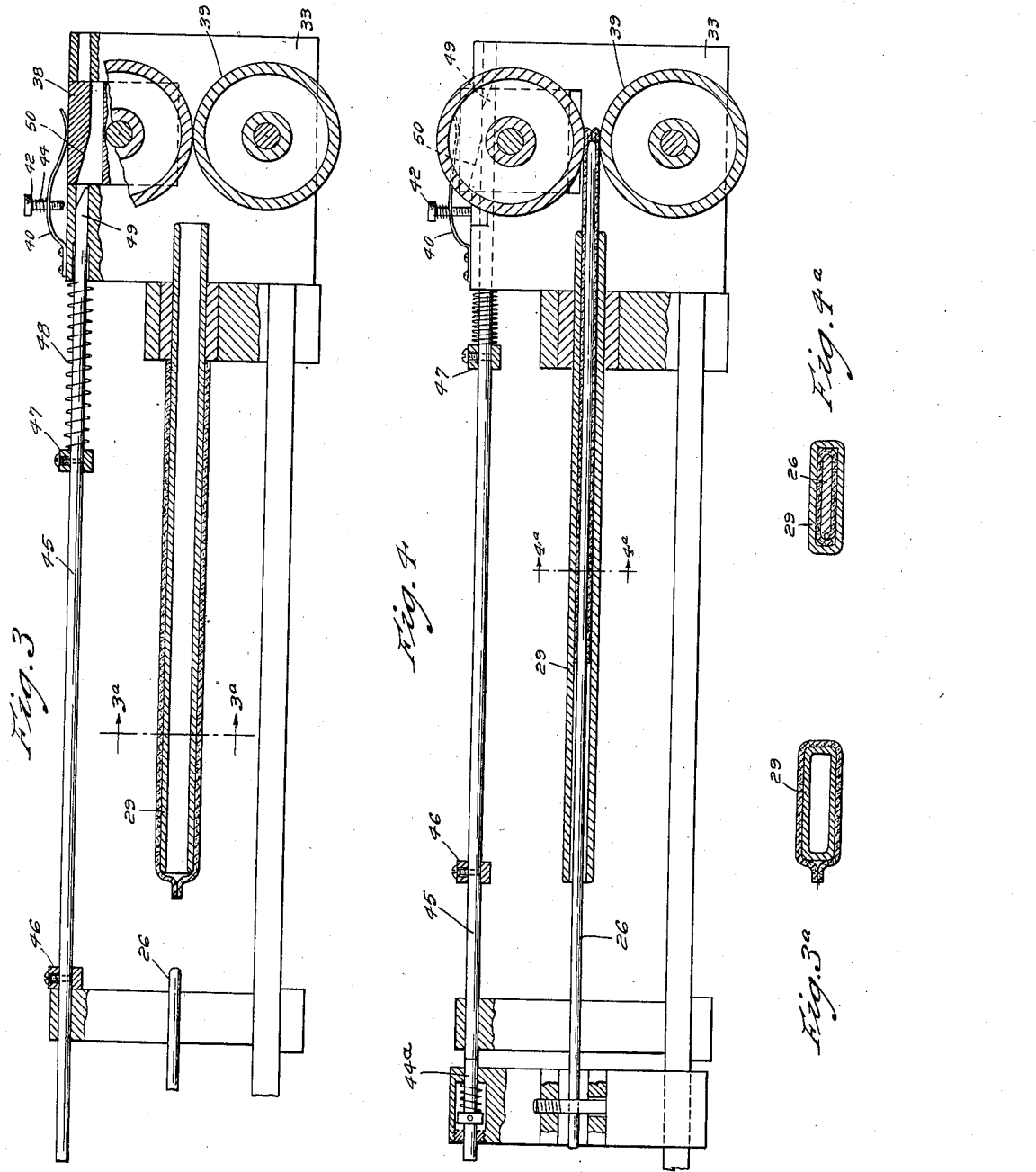

Patented Apr. 16, 1940

2,197,659

UNITED STATES PATENT OFFICE 2,197,659

AUTOMATIC BELT TURNER MECHANISM

Salvador Garcia, Somerset, Mass.

Application February 20, 1939, Serial No. 257,294

13 Claims. (Cl. 223—40)

My present invention relates to a turner or reverser for use in connection with the turning of tubular textile materials, and particularly for reversing ladies' belts.

The principal object of my invention resides in the provision of a power machine for receiving a fabric belt in a reversed condition, and for turning the belt, shaping it, pushing the corners out, and pressing the turned belt.

Another object of the invention is to provide an automatic turner or reverser which is simple in construction and easy of operation.

With the above and other objects and advantageous features in view, the invention consists of a novel arrangement of parts, more fully described in the detailed description following, in conjunction with the accompanying drawings, and more specifically defined in the appended claims.

In the drawings:

Fig. 1 is a plan view of the novel belt reverser;

Fig. 2 is a side elevation thereof, parts being shown in section;

Fig. 3 is an enlarged sectional detail of the belt carrier tube and pressing rolls;

Fig. 3a is a section on the line 3a—3a of Fig. 3;

Fig. 4 is a view similar to Fig. 3, the parts having moved away from reversing position;

Fig. 4a is a section on the line 4a—4a of Fig. 4;

Fig. 5 is a section on the line 5—5 of Fig. 1;

Fig. 6 is a section on the line 6—6 of Fig. 1; and

Fig. 7 is a section on the line 8—8 of Fig. 1.

It has been found desirable to provide a power-driven machine for turning a cloth belt which is sewed together with the raw seams exposed. Belts of this kind are usually used for house dresses made of cotton and other textile materials, and the turning operation is necessary to put the raw sewed seams on the inside and the right side of the goods outside. The operations normally used for turning a belt include picking up the belt and mounting on a turner rod, moving the turning mechanism so as to reverse the belt, pushing the corners of the belt out in proper position, and shaping and pressing the turned belt. I have devised a power machine which requires but two manual operations, namely picking the belt up and mounting the belt, the machine itself then automatically reversing the belt, pushing out the corners, shaping the belt, and pressing the belt.

Referring to the drawings, the novel machine includes a frame 10 having a plurality of spaced bearing brackets 11, the preferred number being three, each bearing bracket being provided with a central oiling duct 12 which is fed by means of an oil well 13. Rotatably mounted in these brackets is an operating shaft 14 adapted to be power rotated in one direction by means of a pulley 15 or other suitable turning mechanism. The shaft includes a return grooved portion 16 comprising spiral grooves for moving a carrier block forwardly, and reverse spiral grooves for moving the carrier block rearwardly, as hereinafter explained, and has a worm gear 17 keyed to the free end thereof, as shown in Fig. 2, for rotating a pressing roller as hereinafter explained.

A flat slide plate 18 is mounted in the bearing brackets, and supports the carrier block 19 for sliding movement, the carrier block having flanged ends 20 extending inwardly to retain the carrier block on its slide plate, and a vertical or upright post 21, the post 21 having a rod 22 mounted therein which is provided with a contact end 23 seating in the spiral groove of the return grooved portion 16. The carrier block also has a forwardly extending portion 24, see Fig. 5, in which an elongated turner bar 26 is fixedly mounted, see Fig. 1, this elongated turner bar being flat and of narrow width and having its free end convex as indicated at 27, to provide two spaced projecting corners 28.

Referring now to Figs. 1, 3 and 4, a belt carrier tube 29 is mounted in a bracket 30 secured to the frame 10, the carrier tube 29 being aligned with the turner bar 26, whereby an inside-out belt, positioned on the carrier tube 29 as shown in Fig. 3, is engaged by the turner bar 26 as shown in Fig. 4, and is reversed by being pushed through the carrier tube and about the turner bar. As shown in Figs. 2 and 6, the spiral gear 17 engages a spiral gear 31, which is keyed to a shaft 32 mounted in spaced supporting bearing plates 33, a pressing roller 34 being secured to the end of the shaft 32. A second shaft 35, normally in spaced parallel alignment with the shaft 32, has its rear end mounted in a bearing block 36 which is pivoted in the bearing plate 33, by means of a pivot pin 37, the forward end of the shaft passing through a second bearing block 38, adapted to normally rest on the forward bearing plate 33; a second pressing roller 39 is secured to the end of the shaft 35 in pressing relation to the power-driven pressing roller 34.

A spring plate 40 is secured at one end to the bearing block 33, and has an opening 41 through which a manually adjustable stud 42 extends into threaded engagement with a correspondingly threaded recess 43 in the bearing block 33, a coil spring 44 extending between the knurled head of the stud 42 and the spring plate 40. The pressure of the spring 44 on the spring plate 40 causes the free end of the spring plate to engage the bearing block 38 so as to exert a regulated spring pressure to hold the upper pressing roller 39 in pressing engagement with the power-driven pressing roller 34.

Referring now to Figs. 1 and 4, the carrier block 19, which carries the turner bar 26, has a spring-pressed contact lug or pin 44a extending transversely therethrough. When the carrier block is at the extreme left, the lug 44a is forced against the bearing bracket 11 and pushed towards the right. This compresses the surrounding spring which bears against the carrier block and tends to push it into starting position. When the carrier block has moved to almost the end of its operating stroke (toward the right), the inner end of the lug 44a engages the end of a rod 45. The rod 45 slidably extends through the rear bracket 11 and has a fixed stop 46 mounted on the power block end and a similar stop 47 mounted at the other end, a coil spring 48 being positioned between the stop 47 and the bracket 11, see Figs. 3 and 4. As the rod 45 is contacted by the lug 44a and is moved against the pressure of the spring 48, the free end 49 of the rod 45 engages a wedge-shaped cam 50 on the bearing block 38 and lifts the bearing block and the pressing roller 39 against the pressure of the spring 44.

Referring now to Fig. 1, a lever 51 is mounted on the frame intermediate its ends, and has a knurled arm 52 at one end for manual actuation, the other end 53 having a lever 54 pivoted thereon, and manually held outwardly by a spring 55 secured between the upper end of the lever 54 and a fixed boss 56 on the lever 51. The free end 57 of the lever 54 manually engages one end 58 of a lever 59, hinged to the frame, the other end 60 being a latch which is positioned to normally lie in the path of the carrier block 19, whereby manual actuation of the lever 51 moves the latch lever 59 to permit forward movement of the carrier block. A spring 61 mounted on the frame keeps the latch in operative relation to the carrier block; the lever 51 may be operated by means of a foot pedal, as shown, by passing a pull wire over a fixed pulley 62 and through a suitable opening or recess 63 in the lever 51. The end grooves of the return grooved shaft are arranged so that the carrier block may idle until the latch is released. A guard frame 64 is preferably mounted on the frame and the bearing brackets to extend over the operating parts.

The operation of the automatic belt reverser may now be explained. The operator picks up an "inside-out" belt and slips it over the carrier tube; then he moves the lever 51 by pressing the starting arm 52, thus turning the latch and permitting the carrier block to move forwardly. The spring-pressed pin 44a, which projects through both sides exerts a resilient push on the carrier block to assist this forward motion. This forward motion carries the turner bar forwardly to engage the end of the belt and then draw the belt around itself and through the inside of the carrier tube, the end of the turner bar pushing the belt corners out and the bar spreading and shaping the turned belt. As the carrier block nears the end of its forward motion, the pin 44a contacts the rod 45, and pushes it against the tension of spring 48 to engage the bearing block 38 and lift the upper pressing roller; the turner bar and the turned belt now pass between the two rollers, as shown in Fig. 4, and the spring 48 causes the rod 45 to press back to start the carrier block back on its return movement. This permits the rod 45 to move back, and the upper roller moves down to grip the end of the turned belt, whereupon the two rollers pull the belt outwardly and press it. The returning carrier block moves past the patch 60, which turns under the pressure of its spring 61 to lock the carrier block against forward movement until the lever 51 is again manually turned.

It is thus evident that the entire belt turning operation is automatic, and that belt turning, which normally requires at least five operations, can be accomplished with but two manual operations, in a better and more satisfactory manner, the turned belt being shaped and pressed, and having its corners moved outwardly.

While I have described the automatic machine as applied to belt turning, the construction may be changed to turn any textile or fabric tube or hollow article, and the size, shape, and relative arrangement of the parts may be varied, to meet the requirements for different textile articles to be turned, without departing from the spirit and the scope of the invention as defined in the appended claims.

I claim:

1. In an apparatus for turning tubular articles, a carrier tube, a movable carrier block, a turner bar secured to said block and movable through said carrier tube, and means for reciprocating said carrier block, said means comprising a return grooved shaft and a finger carried by said block and extending into the grooves of said shaft.

2. In an apparatus for turning tubular articles, a carrier tube, a movable carrier block, a turner bar secured to said block and movable through said carrier tube, means for reciprocating said carrier block, said means comprising a return grooved shaft and a finger carried by said block and extending into the grooves of said shaft, and manually controlled latch means for holding said carrier block against movement.

3. In an apparatus for turning tubular articles, a carrier tube, a movable carrier block, a turner bar secured to said block and movable through said carrier tube, means for reciprocating said carrier block, said means including a return grooved shaft mounted in spaced parallel relation to the movement of said carrier block, a finger carried by said block and extending into the grooves of said shaft, and a pair of pressing rollers positioned adjacent the exit end of said carrier tube.

4. In an apparatus for turning tubular articles, a carrier tube, a movable carrier block, a turner bar secured to said block and movable through said carrier tube, means for reciprocating said carrier block, said means comprising a return grooved shaft and a finger carried by said block and extending into the grooves of said shaft, and a pair of pressing rollers positioned adjacent the exit end of said carrier tube.

5. In an apparatus for turning tubular articles, a carrier tube, a movable carrier block, a turner bar secured to said block and movable through said carrier tube, means for reciprocating said carrier block, a pair of pressing rollers positioned adjacent the exit end of said carrier tube, and means responsive to forward movement of said carrier block for separating said rollers to permit entry of a turned article therebetween.

6. In an apparatus for turning tubular articles, a carrier tube, a movable carrier block, a turner bar secured to said block and movable through said carrier tube, means for reciprocating said carrier block, said means including a return grooved shaft mounted in spaced parallel relation to the movement of said carrier block, a finger carried by said block and extending into the grooves of said shaft, a pair of pressing rollers positioned adjacent the exit end of said carrier tube, and means responsive to forward movement of said carrier block for separating said rollers to permit entry of a turned article therebetween.

7. In an apparatus for turning tubular articles, a carrier tube, a movable carrier block, a turner bar secured to said block and movable through said carrier tube, means for reciprocating said carrier block, said means including a return grooved shaft mounted in spaced parallel relation to the movement of said carrier block, a finger carried by said block and extending into the grooves of said shaft, a pair of pressing rollers adapted to receive a turned article, one of said rollers being power driven and the other movably mounted and spring pressed against said power-driven roller, and means for lifting the movable roller in timed relation to movement of the carrier block.

8. In an apparatus for turning tubular articles, a carrier tube, a movable carrier block, a turner bar secured to said block and movable through said carrier tube, means for reciprocating said carrier block, a pair of pressing rollers adapted to receive a turned article, one of said rollers being power driven and the other movable mounted and spring pressed against said power-driven roller, and means for lifting the movable roller in timed relation to movement of the carrier block comprising a rod adapted to be engaged by said carrier block and a cam operatively connected to said movable roller and adapted to be engaged by said rod.

9. In an apparatus for turning tubular articles, a carrier tube, a movable carrier block, a turner bar secured to said block and movable through said carrier tube, means for reciprocating said carrier block, said means including a return grooved shaft and a finger carried by said block and extending into the grooves of said shaft, and resilient means for urging said cooperating finger into operative engagement with the grooves of said shaft at the termination of each reciprocation.

10. In an apparatus for turning tubular articles, a carrier tube, a movable carrier block, a turner bar secured to said block and movable through said carrier tube, a return grooved shaft rotatably mounted in spaced parallel relation to the movement of said block, a finger carried by said block and extending into the grooves of said shaft, and means for rotating said shaft.

11. In an apparatus for turning tubular articles, a carrier tube, a movable carrier block, a turner bar secured to said block and movable through said carrier tube, a return grooved shaft rotatably mounted in spaced parallel relation to the movement of said block, a finger carried by said block and extending into the grooves of said shaft, manually controlled means for holding said carrier block in an idling position whereby said finger is out of engagement wihth said grooves, and means for rotating said shaft.

12. In an apparatus for turning tubular articles, a carrier tube, a movable carrier block, a turner bar secured to said block and movable through said carrier tube, a return grooved shaft rotatably mounted in spaced parallel relation to the movement of said block, a finger carried by said block and extending into the grooves of said shaft, resilient means for urging said finger into operative engagement with the grooves of said shaft at the termination of each reciprocation, and means for rotating said shaft.

13. In an apparatus for turning tubular articles, a carrier tube, a movable carrier block, a turner bar secured to said block and movable through said carrier tube, a return grooved shaft rotatably mounted in spaced parallel relation to the movement of said block, a finger carried by said block and extending into the grooves of said shaft, resilient means for urging said finger into operative engagement with the grooves of said shaft at the termination of each reciprocation, manually controlled means for holding said carrier block in an idling position whereby said finger is out of engagement with said grooves, and means for rotating said shaft.

SALVADOR GARCIA.